United States Patent
Vangala

(10) Patent No.: US 10,483,608 B2
(45) Date of Patent: *Nov. 19, 2019

(54) RF DIELECTRIC WAVEGUIDE DUPLEXER FILTER MODULE

(71) Applicant: CTS Corporation, Lisle, IL (US)

(72) Inventor: Reddy Vangala, Albuquerque, NM (US)

(73) Assignee: CTS Corporation, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,640

(22) Filed: Oct. 26, 2018

(65) Prior Publication Data

US 2019/0067773 A1 Feb. 28, 2019

Related U.S. Application Data

(63) Continuation-in-part of application No. 14/682,271, filed on Apr. 9, 2015, now Pat. No. 9,466,864, and a
(Continued)

(51) Int. Cl.
*H01P 1/213* (2006.01)
*H01P 7/10* (2006.01)
(Continued)

(52) U.S. Cl.
CPC .......... *H01P 1/2138* (2013.01); *H01P 1/2002* (2013.01); *H01P 1/2088* (2013.01);
(Continued)

(58) Field of Classification Search
CPC ........ H01P 1/2002; H01P 1/207; H01P 1/208; H01P 1/2088; H01P 7/10
(Continued)

(56) References Cited

U.S. PATENT DOCUMENTS 3,882,434 A 5/1975 Levy
3,955,161 A 5/1976 MacTurk
(Continued)

FOREIGN PATENT DOCUMENTS

CN 1398014 A 2/2003
CN 1507109 A 6/2004
(Continued)

OTHER PUBLICATIONS

Ruiz-Cruz J et al: "Rectangular Waveguide Elliptic Filters with Capacitive and Inductive Irises and Integrated Coaxial Excitation", 2005 IEEE MTT-S International Microwave Symposium, Piscataway, NJ, USA, IEEE, (Jun. 12, 2005) pp. 269-272, EP010844740, DOI: 10.1109/MWSYM.2005.1516577, ISBN: 978-0-7803-8846-8 p. 269; figures 1,3.
Paul Wade: "Rectangular Waveguide to Coax Transition Design", QEX, Nov./Dec. 2006, pp. 10-17, published by American Radio Relay League, Newington, Connecticut, US.
(Continued)

*Primary Examiner* — Rakesh B Patel
(74) *Attorney, Agent, or Firm* — Daniel Deneufbourg

(57) ABSTRACT

An RF dielectric waveguide duplexer filter module with antenna and lower and upper Tx and Rx signal transmission blocks of dielectric material attached together in a side-by-side and stacked relationship. The blocks are covered with conductive material. Antenna and Tx and Rx input/outputs are defined at opposite ends of the filter module. RF signal transmission windows define direct coupling RF signal transmission paths between the antenna and the Tx and Rx blocks and between the lower and upper Tx and Rx blocks. One or more bridges of dielectric material on the lower Tx and Rx blocks define inductive cross-coupling Tx and Rx signal transmission paths. The Tx signal is transmitted only in the direction of the antenna block or between the upper and lower Tx blocks. The Rx signal is transmitted only in the direction of the Rx RF signal input/output or between the upper and lower Rx blocks.

15 Claims, 5 Drawing Sheets

Related U.S. Application Data continuation-in-part of application No. 14/708,870, filed on May 11, 2015, now Pat. No. 9,437,908, and a continuation-in-part of application No. 14/842,920, filed on Sep. 2, 2015, now Pat. No. 9,431,690, and a continuation-in-part of application No. 14/842,946, filed on Sep. 2, 2015, now Pat. No. 9,437,909, and a continuation-in-part of application No. 15/152,325, filed on May 11, 2016, now Pat. No. 10,050,321, and a continuation of application No. 15/198,101, filed on Jun. 30, 2016, now Pat. No. 10,116,028.

(51) Int. Cl.
   *H01P 1/208* (2006.01)
   *H01P 1/20* (2006.01)
   *H04L 5/14* (2006.01)

(52) U.S. Cl.
   CPC ............... *H01P 1/213* (2013.01); *H01P 7/10* (2013.01); *H04L 5/1461* (2013.01)

(58) Field of Classification Search
   USPC .............................. 333/135, 202, 208, 209
   See application file for complete search history.

(56) References Cited

U.S. PATENT DOCUMENTS

| | | |
|---|---|---|
| 4,396,896 A | 8/1983 | Williams |
| 4,431,977 A | 2/1984 | Sokola et al. |
| 4,609,892 A | 9/1986 | Higgins, Jr. |
| 4,692,726 A | 9/1987 | Green et al. |
| 4,706,051 A | 11/1987 | Dieleman et al. |
| 4,773,208 A | 3/1988 | Ishikawa et al. |
| 4,742,562 A | 5/1988 | Kommrusch |
| 4,800,348 A | 1/1989 | Rosar et al. |
| 4,806,889 A | 2/1989 | Nakano et al. |
| 4,837,535 A | 6/1989 | Konishi et al. |
| 4,940,955 A | 7/1990 | Higgins, Jr. |
| 4,963,844 A | 10/1990 | Konishi et al. |
| 4,996,506 A | 2/1991 | Ishikawa et al. |
| 5,004,992 A | 4/1991 | Grieco et al. |
| 5,023,944 A | 6/1991 | Bradley |
| 5,130,682 A | 7/1992 | Agahi-Kesheh |
| 5,208,565 A | 5/1993 | Sogo et al. |
| 5,243,309 A | 9/1993 | L'Ecuyer |
| 5,288,351 A | 2/1994 | Hoang et al. |
| 5,285,570 A | 5/1994 | Fulinara |
| 5,365,203 A | 11/1994 | Nakamura et al. |
| 5,382,931 A | 1/1995 | Piloto et al. |
| 5,416,454 A | 5/1995 | McVetty |
| 5,525,946 A | 6/1996 | Tsujiguchi et al. |
| 5,528,204 A | 6/1996 | Hoang et al. |
| 5,528,207 A | 6/1996 | Ito |
| 5,537,082 A | 7/1996 | Tada et al. |
| 5,572,175 A | 11/1996 | Tada et al. |
| 5,602,518 A | 2/1997 | Clifford, Jr. et al. |
| 5,719,539 A | 2/1998 | Ishizaki et al. |
| 5,731,751 A | 3/1998 | Vangala |
| 5,821,836 A | 10/1998 | Katehi et al. |
| 5,850,168 A | 12/1998 | McVetty et al. |
| 5,926,078 A | 7/1999 | Hino et al. |
| 5,926,079 A | 7/1999 | Heine et al. |
| 5,929,726 A | 7/1999 | Ito et al. |
| 5,999,070 A | 12/1999 | Endo |
| 6,002,306 A | 12/1999 | Arakawa et al. |
| 6,002,307 A * | 12/1999 | Arakawa ............... H01P 1/2088 333/135 |
| 6,016,091 A * | 1/2000 | Hidaka ................. H01P 1/2084 333/202 |
| 6,023,207 A | 2/2000 | Ito et al. |
| 6,026,281 A | 2/2000 | Yorita |
| 6,137,383 A | 10/2000 | De Lillo |
| 6,154,106 A | 11/2000 | De Lillo |
| 6,160,463 A | 12/2000 | Arakawa et al. |
| 6,181,225 B1 | 1/2001 | Bettner |
| 6,255,921 B1 | 7/2001 | Arakawa et al. |
| 6,281,764 B1 | 8/2001 | Arakawa et al. |
| 6,329,890 B1 | 12/2001 | Brooks et al. |
| 6,351,198 B1 | 2/2002 | Tsukamoto et al. |
| 6,437,655 B1 | 8/2002 | Andoh et al. |
| 6,504,446 B1 | 1/2003 | Ishihara et al. |
| 6,535,083 B1 | 3/2003 | Hageman et al. |
| 6,556,106 B1 | 4/2003 | Sano et al. |
| 6,549,095 B2 | 5/2003 | Tsukamoto et al. |
| 6,559,740 B1 | 5/2003 | Schulz et al. |
| 6,568,067 B2 | 5/2003 | Takeda |
| 6,594,425 B2 | 7/2003 | Tapalian et al. |
| 6,677,837 B2 | 1/2004 | Kojima et al. |
| 6,757,963 B2 | 7/2004 | Meier et al. |
| 6,791,403 B1 | 9/2004 | Tayrani et al. |
| 6,801,106 B2 | 10/2004 | Ono et al. |
| 6,834,429 B2 | 12/2004 | Blair et al. |
| 6,844,861 B2 | 1/2005 | Peterson |
| 6,888,973 B2 | 5/2005 | Kolodziejski et al. |
| 6,900,150 B2 | 5/2005 | Jacquin et al. |
| 6,909,339 B2 | 6/2005 | Yonekura et al. |
| 6,909,345 B1 | 6/2005 | Salmela et al. |
| 6,927,653 B2 | 8/2005 | Uchimura et al. |
| 6,977,560 B2 | 12/2005 | Iroh et al. |
| 6,977,566 B2 | 12/2005 | Fukunaga |
| 7,009,470 B2 | 3/2006 | Yatabe et al. |
| 7,068,127 B2 | 6/2006 | Wilber et al. |
| 7,132,905 B2 | 11/2006 | Sano |
| 7,142,074 B2 | 11/2006 | Kim et al. |
| 7,170,373 B2 | 1/2007 | Ito et al. |
| 7,271,686 B2 | 9/2007 | Yoshikawa et al. |
| 7,323,954 B2 | 1/2008 | Lee et al. |
| 7,449,979 B2 | 11/2008 | Koh et al. |
| 7,545,235 B2 | 6/2009 | Mansour et al. |
| 7,659,799 B2 | 2/2010 | Jun et al. |
| 7,714,680 B2 | 5/2010 | Vangala et al. |
| 8,008,993 B2 | 8/2011 | Milson et al. |
| 8,072,294 B2 | 12/2011 | Tanpo et al. |
| 8,171,617 B2 | 5/2012 | Vangala |
| 8,284,000 B2 | 10/2012 | Fukunaga |
| 8,314,667 B2 | 11/2012 | Uhm et al. |
| 8,823,470 B2 | 9/2014 | Vangala |
| 9,030,278 B2 | 5/2015 | Vangala |
| 9,030,279 B2 | 5/2015 | Vangala |
| 9,130,255 B2 | 9/2015 | Rogozine et al. |
| 9,130,256 B2 | 9/2015 | Rogozine et al. |
| 9,130,257 B2 | 9/2015 | Vangala |
| 9,130,258 B2 | 9/2015 | Vangala et al. |
| 9,431,690 B2 | 8/2016 | Rogozine et al. |
| 9,437,908 B2 | 9/2016 | Vangala |
| 9,466,864 B2 | 10/2016 | Rogozine et al. |
| 9,666,921 B2 | 5/2017 | Rogozine et al. |
| 10,050,321 B2 | 8/2018 | Rogozine et al. |
| 10,116,028 B2 * | 10/2018 | Vangala ............... H01P 1/2002 |
| 2001/0024147 A1 | 9/2001 | Arkawa et al. |
| 2002/0024410 A1 | 2/2002 | Guglielmi et al. |
| 2003/0006865 A1 | 1/2003 | Kim et al. |
| 2004/0000968 A1 | 1/2004 | White et al. |
| 2004/0056737 A1 | 3/2004 | Carpintero et al. |
| 2004/0129958 A1 | 7/2004 | Kho et al. |
| 2004/0257194 A1 | 12/2004 | Casey et al. |
| 2005/0057402 A1 | 3/2005 | Ohno et al. |
| 2007/0120628 A1 | 5/2007 | Jun et al. |
| 2009/0015352 A1 | 1/2009 | Goebel et al. |
| 2009/0102582 A1 | 4/2009 | Van Der Heijden et al. |
| 2009/0146761 A1 | 6/2009 | Nummerdor |
| 2009/0201106 A1 | 8/2009 | Iio et al. |
| 2009/0231064 A1 | 9/2009 | Bates et al. |
| 2010/0024973 A1 | 2/2010 | Vangala |
| 2010/0253450 A1 | 10/2010 | Kim et al. |
| 2011/0032050 A1 * | 2/2011 | Kouki ................... H01P 1/2135 333/132 |
| 2011/0279200 A1 | 11/2011 | Vangala |
| 2012/0049983 A1 | 3/2012 | Uhm et al. |
| 2012/0229233 A1 | 9/2012 | Ito |
| 2012/0286901 A1 | 11/2012 | Vangala |
| 2013/0214878 A1 | 8/2013 | Gorisee et al. |

(56) References Cited

U.S. PATENT DOCUMENTS

| | | |
|---|---|---|
| 2014/0077900 A1 | 3/2014 | Rogozine et al. |
| 2014/0266514 A1 | 9/2014 | Rogozine et al. |
| 2015/0084720 A1 | 3/2015 | Vangala et al. |
| 2015/0295294 A1 | 10/2015 | Rogozine et al. |
| 2019/0067773 A1 | 2/2019 | Vangala |

FOREIGN PATENT DOCUMENTS

| | | |
|---|---|---|
| CN | 201898182 U | 7/2011 |
| CN | 102361113 A | 2/2012 |
| CN | 102361113 B | 8/2014 |
| DE | 2056528 A1 | 5/1972 |
| DE | 102008017967 A1 | 10/2009 |
| EP | 0322993 A2 | 7/1989 |
| EP | 0322993 A3 | 4/1990 |
| EP | 0444948 A2 | 3/1991 |
| EP | 0757401 A2 | 2/1997 |
| EP | 0859423 A1 | 8/1998 |
| EP | 1024548 A1 | 2/2000 |
| EP | 0997964 A2 | 5/2000 |
| EP | 0997964 A3 | 9/2001 |
| EP | 1278264 A1 | 1/2003 |
| EP | 1439599 A1 | 7/2004 |
| FR | 2318512 A1 | 2/1977 |
| JP | 62038601 | 2/1987 |
| JP | 6-177607 A | 6/1994 |
| JP | 6177607 | 6/1994 |
| JP | 10173407 | 6/1998 |
| JP | 2000286606 A | 10/2000 |
| JP | 3405783 B2 | 3/2003 |
| JP | 2003298313 | 10/2003 |
| JP | 2005-269012 A | 9/2005 |
| JP | 2006157486 | 6/2006 |
| JP | 2010028381 A | 2/2010 |
| JP | 2010-130663 A | 6/2010 |
| JP | 2011244451 A | 12/2011 |
| KR | 2003-0007057 A | 1/2003 |
| KR | 10-0399041 B1 | 9/2003 |
| KR | 10-0522726 B1 | 10/2005 |
| KR | 10-0586502 B1 | 5/2006 |
| KR | 10-0852487 B1 | 8/2008 |
| KR | 10-0866978 B1 | 11/2008 |
| KR | 10-0906215 B1 | 7/2009 |
| KR | 10-0932705 B1 | 12/2009 |
| KR | 10-2010-0030862 A | 3/2010 |
| KR | 10-0954801 B1 | 4/2010 |
| KR | 10-0995758 B1 | 11/2010 |
| KR | 10-1001935 B1 | 12/2010 |
| KR | 10-1081419 B1 | 11/2011 |
| KR | 10-1126183 B1 | 3/2012 |
| KR | 10-1431005 B1 | 8/2014 |
| KR | 10-1442220 B1 | 9/2014 |
| KR | 10-1581687 B1 | 12/2015 |
| KR | 10-1616768 B1 | 4/2016 |
| KR | 1020170048753 A | 5/2017 |
| KR | 10-1919456 B1 | 2/2019 |
| WO | 199509451 | 4/1995 |
| WO | 2000024080 | 4/2000 |
| WO | 0038270 A1 | 6/2000 |
| WO | 2015090107 A1 | 3/2002 |
| WO | 05091427 | 9/2005 |
| WO | 2013012438 A1 | 1/2013 |
| WO | 02078119 A1 | 6/2015 |

OTHER PUBLICATIONS

Yoji Isota, Moriyasu Miyazaki, Osami Ishida, Fumio Takeda, Mitsubishi Electric Corporation. "A Grooved Monoblock Comb-Line Filter Suppressing the Third Harmonics", IEEE 1987 MTT-S Digest, pp. 383-386, published by IEEE, New York, New York, US.

C. Choi, Fig. 2.13, Monolithic Plated Ceramic Waveguide Filters, Mar. 31, 1986, Motorola, Inc., Schaumburg, Illinois, U.S.

Kocbach J. et al: "Design Procedure for Waveguide Filters with Cross-Couplings", 2002 IEEE MTT-S International Microwave Symposium Digest (Cat. No. 02CH37278) IEEE Piscataway, NJ, USA; IEEE MTT-S International Microwave Symposium, IEEE, Jun. 2, 2002, pp. 1449-1452, XP001113877, DOI: 10.1109/WMSYM. 2002.1012128 ISBN: 978-0-8703-7239-9 abstract; figure 1.

N. Marcuvitz, Waveguide Handbook, McGraw-Hill Book Co., New York City, Ch. 5, 1951.

Y. Konishi, "Novel dielectric waveguide components-microwave applications of new ceramic materials," Proc. IEEE, vo. 79, pp. 726-740, Jun. 1991.

K. Sano, "Dielectric waveguide filter with low profile and low insertion loss," IEEE Trans. on Microwave Theory & Tech., vol. 47, pp. 2299-2303, Dec. 1999.

K. Sano and T. Yoneyama, "A transition from Microstrip to Dielectric Filled Rectangular Waveguide in Surface Mounting," IEEE MTT-S Int. Microwave Symp. Digest, pp. 813-816, 2002.

I. Awai, A.C. Kundu, and T. Yamashita, "Equivalent circuit representation and explanation of attenuation poles of a dual-mode dielectric resonator bandpass filter," IEEE Trans. Microwave Theory & Tech., vol. 46, pp. 2159-2163, Dec. 1998.

A.D. Lapidus and C. Rossiter, "Cross-coupling in microwave bandpass filters," Microwave Journal, pp. 22-46, Nov. 2004.

Tze-min Shen; Chi-Feng Chen' Huang, Ting-Yi; Wu, Ruey-Beei, "Design of Vertically Stacked Waveguide Filters in LTCC," Microwave Theory and Techniques, IEEE Transactions on, vol. 55, No. 8, pp. 1771,1779, Aug. 2007.

Hung-Yi Chien; Tze-Min Shen; Huang; Ting-Yi; Wei-Hsin Wang; Wu, Ruey-Beei, "Miniaturized Bandpass Filters with Double-Folded Substrate Integrated Resonators in LTCC," Microwave Theory and Techniques, IEEE Transactions on vol. 57, No. 7, pp. 1774, 1782, Jul. 2009.

Bo-Jiun Chen; Tze-Min Shen; Wu, Ruey-Beei, "Dual-Band Vertically Stacked Laminated Waveguide Filter Design in LTCC Technology," Microwave Theory and Techniques, IEEE Transactions on, vol. 57, No. 6, pp. 1554, 1562, Jun. 2009.

Wolfram Wersing, Microwave ceramics for resonators and filters, Current Opinion in Solid State and Materials Science, vol. 1, Issue 5, Oct. 1996, pp. 715-731, ISSN 1359-0286.

Shen T et al, Full-Wave Design of Canonical Waveguide Filters by Optimation, 2001 IEEE MTT-S International Microwave Symposium Digest. (IMS 2001) Phoenix, AZ, May 20-25, 2001, pp. 1487-1490.

John David Rhodes, The Generalized Direct-Coupled Cavity Linear Phase Filter, IEEE Transactions on Microwave Theory and Techniques, vol. MTT-18, No. 6, Jun. 1, 1970 (Jun. 1, 1970), pp. 308-313, XP001401320, abstract.

Y. Cassivi et al, Low-Cost and High-Q Millimeter-Wave Resonator Using Substrate Integrated Waveguide Technique, Microwave Conference, 2002. 32nd European, pp. 1-4.

Emilio Arnieri et al, Coaxially Fed Substrate Integrated Radiating Waveguides, Antennas and Propogation Society International Symposium, 2007 IEEE, pp. 2718-2721.

* cited by examiner

RF DIELECTRIC WAVEGUIDE DUPLEXER FILTER MODULE

CROSS-REFERENCE TO RELATED PATENT APPLICATIONS

This application is a continuation application that claims the benefit of the filing date and disclosure of U.S. patent application Ser. No. 15/198,101 filed on Jun. 30, 2016, the contents of which are incorporated herein by reference.

This application is also a continuation-in-part application that claims the benefit of the filing date and disclosure of U.S. patent application Ser. No. 14/682,271 filed on Apr. 9, 2015, now U.S. Pat. No. 9,466,864 issued on Oct. 11, 2016, the contents of which are incorporated herein by reference.

This application is a continuation-in-part application that claims the benefit of the filing date and disclosure of U.S. patent application Ser. No. 14/708,870 filed on May 11, 2015, now U.S. Pat. No. 9,437,908 issued on Sep. 6, 2016, the contents of which are incorporated herein by reference, which is a continuation-in-part of U.S. patent application Ser. No. 13/373,862 filed on Dec. 3, 2011, now U.S. Pat. No. 9,030,279 issued on May 12, 2015.

This application is also a continuation-in-part application that claims the benefit of the filing date and disclosure of U.S. patent application Ser. No. 14/842,920 filed on Sep. 2, 2015, now U.S. Pat. No. 9,431,690 issued on Aug. 30, 2016, the contents of which are incorporated herein by reference, which is a continuation-in-part of U.S. patent application Ser. No. 14/088,471 filed on Nov. 25, 2013, now U.S. Pat. No. 9,130,255 issued on Sep. 8, 2015.

This application is also a continuation-in-part application that claims the benefit of the filing date and disclosure of U.S. patent application Ser. No. 14/842,946 filed on Sep. 2, 2015, now U.S. Pat. No. 9,437,909 issued on Sep. 6, 2016, the contents of which are incorporated herein by reference, which is a continuation-in-part of U.S. patent application Ser. No. 14/490,284 filed on Sep. 18, 2014, now U.S. Pat. No. 9,130,258 issued on Sep. 8, 2015.

This application is also a continuation-in-part application that claims the benefit of the filing date and disclosure of U.S. patent application Ser. No. 15/152,325 filed on May 11, 2016, now U.S. Pat. No. 10,050,321 issued on Aug. 14, 2018, the contents of which are incorporated herein by reference.

This application also claims the benefit of the filing date and disclosure of U.S. Provisional Patent Application Ser. No. 62/187,282 filed on Jul. 1, 2015, the contents of which are incorporated herein by reference as are all references cited therein.

FIELD OF THE INVENTION

The invention relates generally to an RF dielectric duplexer filter and, more specifically, to an RF dielectric waveguide duplexer filter module.

BACKGROUND OF THE INVENTION

Radio-frequency (RF) duplexer filters provide for the transmission, reception, and filtering of RF TX and RX signals. Current air cavity duplexer filters provide desirable performance but are too large. Current dielectric combline duplexers are smaller in size than air cavity filters but lack the performance of air cavity filters.

The present invention is directed to a radio-frequency (RF) dielectric waveguide duplexer module that is comparable in size to dielectric combline duplexers and offers performance comparable to air cavity filters.

SUMMARY OF THE INVENTION

The present invention is generally directed to an RF dielectric waveguide duplexer filter module for the transmission of Tx and Rx RF signals comprising respective antenna and lower and upper Tx and Rx blocks of dielectric material attached together in a side-by-side and stacked relationship, a layer of conductive material covering each of the respective antenna and lower and upper Tx and Rx blocks, respective antenna and Tx and Rx input/outputs defined at opposite ends of the filter module and located in the antenna and lower Tx and Rx blocks, respective RF signal transmission windows in the layer of conductive material defining direct coupling RF signal transmission paths between the antenna and the Tx and Rx blocks and between the lower and upper Tx and Rx blocks, one or more bridges of dielectric material on the lower Tx and Rx blocks defining cross-coupling Tx and Rx signal transmission paths through the respective lower Tx and Rx blocks, and the Tx signal being transmitted only in the direction of the antenna block or between the upper and lower Tx blocks and the Rx signal being transmitted only in the direction of the Rx RF signal input/output or between the upper and lower Rx blocks.

The present invention is also directed to an RF dielectric waveguide duplexer filter module for the transmission of Tx and Rx RF signals comprising an antenna block of dielectric material including an antenna input/output, the antenna block including a plurality of exterior surfaces covered with a layer of conductive material and first and second antenna Tx and Rx signal transmission regions on one of the exterior surfaces defining a direct coupling path for the transmission of the Tx and Rx RF signals. A Tx RF signal waveguide filter including stacked lower and upper Tx blocks of dielectric material including exterior surfaces covered with a layer of conductive material and defining a plurality of resonators, a plurality of Tx RF signal transmission regions defined between the stacked lower and upper Tx blocks defining a direct coupling path for the transmission of the Tx RF signal between the stacked lower and upper Tx blocks, a third antenna Tx RF signal transmission region defined on one end exterior surface of the lower Tx block defining a direct coupling path for the transmission of the Tx RF signal from the lower Tx block into the antenna block, one or more bridges of dielectric material on the lower Tx block defining a cross coupling path for the transmission of the Tx RF signal through the lower Tx block, and a Tx RF signal input/output defined at the end of the lower Tx block opposite the end with the third antenna Tx RF signal transmission region. An RF Rx signal waveguide filter includes stacked lower and upper Rx blocks of dielectric material including exterior surfaces covered with a layer of conductive material and defining a plurality of resonators, a plurality of Rx RF signal transmission regions defined between the lower and upper Rx blocks defining a direct coupling path for the transmission of the Rx RF signal between the stacked lower and upper Rx blocks, a fourth antenna Rx RF signal transmission region defined on one end exterior surface of the lower Rx block defining a direct coupling path for the transmission of the Rx RF signal from the antenna block into the lower Rx block, one or more bridges of dielectric material on the lower Rx block defining a cross coupling path for the transmission of the Rx RF signal through the lower Rx block, and an Rx RF signal input/output defined at the end of the lower Rx block opposite the end with the fourth antenna Tx RF signal transmission region. The Tx and Rx RF signal waveguide filters are attached in side-by-side relationship and the antenna block being attached to the lower Tx and Rx blocks of the respective Tx and Rx signal waveguide filters in a side-by-side relationship along the end of the lower Tx and Rx signal blocks with the respective antenna Tx and Rx signal transmission regions, the Tx RF signal being adapted for transmission only in the direction of the antenna block or between the upper and lower Tx blocks and the Rx signal being adapted for transmission only in the direction of the Rx RF signal input/output or between the upper and lower Rx blocks.

In one embodiment, the first, second, third, and fourth antenna Tx and Rx signal transmission regions are defined by respective first, second, third and fourth RF signal transmission windows of dielectric material in the layer of conductive material covering the respective blocks of dielectric material.

In one embodiment, the plurality of Tx and Rx RF signal transmission regions between the respective upper and lower Tx and Rx RF signal blocks are defined by respective RF signal transmission windows of dielectric material in the layer of conductive material covering the respective blocks of dielectric material or respective isolated RF signal transmission pads of conductive material.

In one embodiment, the one or more bridges of dielectric material on the lower Tx and Rx blocks are defined by one or more slots in the lower Tx and Rx blocks.

In one embodiment, the Tx and Rx waveguide filters each include respective lower Tx and Rx blocks and respective first and second upper Tx and Rx blocks stacked on the respective lower Tx and Rx blocks.

In one embodiment, an RF signal transmission window and an RF signal transmission pad are defined between the respective Tx and Rx lower blocks and the respective first upper Tx and Rx blocks and at least first and second RF signal transmission windows are defined between the respective Tx and Rx lower blocks and the respective second upper Tx and Rx blocks.

In one embodiment, the Tx and Rx waveguide filters define respective Tx and Rx longitudinal axes, the RF signal transmission window and the RF signal transmission pad defined between the respective Tx and Rx lower blocks and the respective first upper Tx and Rx blocks intersecting the respective Tx and Rx longitudinal axes and at least one of the first and second RF signal transmission windows defined between the respective Tx and Rx lower blocks and the respective second upper Tx and Rx blocks intersecting the respective Tx and Rx longitudinal axes.

In one embodiment, the first and second RF signal transmission windows defined between the respective Rx lower block and the second upper Rx block intersect the Rx longitudinal axis, and further comprising a third RF signal transmission window defined between the Tx lower block and the second upper Tx block, the other of the first and second RF signal transmission windows and the third RF signal transmission window defined between the Tx lower block and the second upper Tx block being located on opposite sides of and parallel to the Rx longitudinal axis.

In one embodiment, the lower block of each of the Tx and Rx waveguide filters defines a step and respective input/output through-holes terminating in respective openings in the respective step, the respective RF Tx and Rx input/outputs surrounding the respective openings in the respective steps.

The present invention is further directed to an RF dielectric waveguide duplexer filter module for the transmission of Tx and Rx RF signals comprising a first plurality of separate blocks of dielectric material each including a plurality of exterior surfaces and coupled together to define a Tx RF signal filter including a base Tx RF signal block defining a Tx RF signal input/output and one or more upper Tx RF signal blocks stacked on the base Tx RF signal block, a second plurality of separate blocks of dielectric material each including a plurality of exterior surfaces and coupled together to define a Rx RF signal filter including a base Rx signal block defining a Rx RF signal input/output and one or more upper Rx RF signal blocks stacked on the base Rx RF signal block, a separate antenna block of dielectric material including a plurality of exterior surfaces and defining a Tx and Rx signal input/output and coupled to the base Tx and Rx signal blocks, a layer of conductive material covering the plurality of exterior surfaces of each of the respective first and second plurality and antenna blocks of dielectric material, first and second direct coupling RF signal transmission paths defined between the antenna block and the respective base Tx and Rx blocks, a plurality of third direct coupling RF signal transmission paths defined between the respective base Tx and Rx blocks and the respective upper Tx and Rx blocks, one or more cross-coupling RF signal transmission paths defined in each of the base Tx and Rx RF signal blocks, the Tx RF signal being transmitted only in the direction of the antenna Tx and Rx signal input/output and between the base and upper Tx RF signal blocks, and the Rx signal being transmitted only in the direction of the Rx RF signal input/output and between the base and upper Rx RF signal blocks.

In one embodiment, the first, second, and third direct coupling RF signal transmission paths are defined by respective direct coupling RF signal transmission windows defined in the layer of conductive material.

In one embodiment, the respective direct coupling RF signal transmission windows are defined by respective regions on selected ones of the plurality of exterior surfaces of the respective blocks which are devoid of the layer of conductive material.

In one embodiment, the one or more cross-coupling RF signal transmission paths are defined by one or more bridges of dielectric material defined in each of the base Tx and Rx RF signal blocks respectively.

In one embodiment, all of the cross-coupling RF signal transmission paths are defined in the base Tx and Rx signal blocks, the respective Tx and Rx RF signal input/outputs are located at one end of the filter module, and the antenna RF signal input/output is located at an opposite end of the filter module.

Other advantages and features of the present invention will be more readily apparent from the following detailed description of the preferred embodiment of the invention, the accompanying drawings, and the appended claims.

BRIEF DESCRIPTION OF THE DRAWINGS

These and other features of the invention can best be understood by the following description of the accompanying FIGURES as follows.

DETAILED DESCRIPTION OF THE EMBODIMENT

Figure 1:
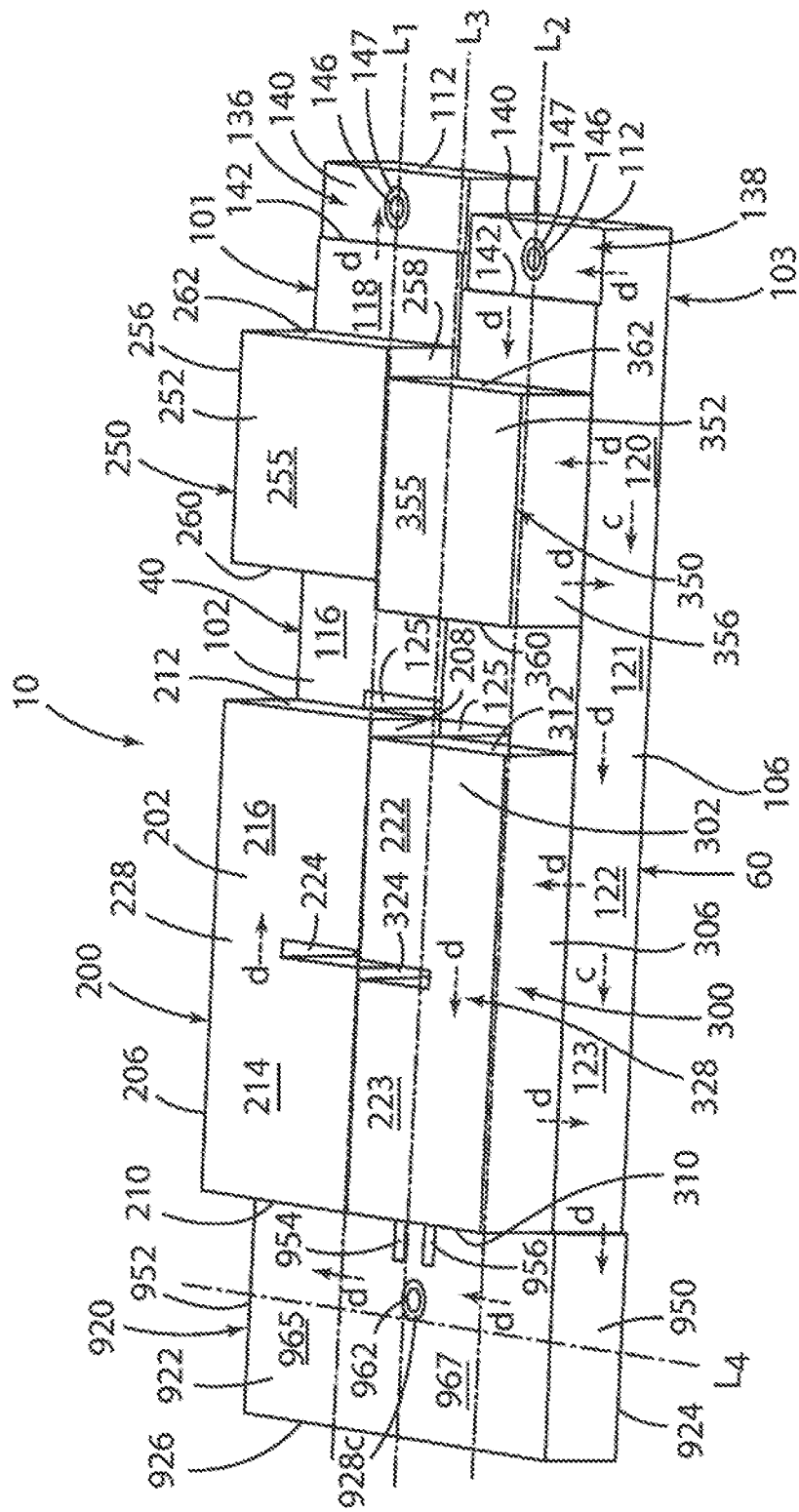
FIG. 1 is an enlarged perspective view of an RF dielectric waveguide duplexer filter module in accordance with the present invention.

FIGS. 1, 2, 3, and 4 depict a radio-frequency (RF) ceramic dielectric duplexer waveguide filter module 10 in accordance with the present invention which comprises three separate filters that have been attached together to form the RF waveguide filter module 10, namely, an Rx (receive) RF signal transmission ceramic dielectric waveguide filter 40, a Tx (transmit) RF signal transmission ceramic dielectric waveguide filter 60, and an antenna Rx and Tx RF signal transmission ceramic dielectric waveguide filter or block 920.

In the embodiment shown, the Rx RF signal waveguide filter 40 includes three separate solid blocks of dielectric material which have been attached together as shown, namely, an elongate generally rectangular shaped base or lower solid block or layer of dielectric material 101 and respective generally rectangular shaped first and second upper solid blocks or layers of dielectric material 200 and 250 which have been stacked on the top of the base block 101 in a spaced-apart and parallel as described in more detail below.

The Tx RF signal waveguide filter 60 likewise includes three separate solid blocks of dielectric material which have been attached together as shown, namely, an elongate generally rectangular shaped base or lower solid block or layer of dielectric material 103 and respective generally rectangular shaped first and second upper solid blocks or layers of dielectric material 300 and 350 which have been stacked on the top of the base block 103 in a spaced-apart and parallel relationship as described in more detail below.

In the embodiment shown, the Rx and Tx RF signal waveguide filters 40 and 60 are attached together in a side-by-side and abutting relationship along respective longitudinally extending exterior surfaces thereof and the antenna block 920 extends in a direction transverse to the Rx and Tx waveguide filters 40 and 60 and is attached to a transverse exterior end surface or face of both of the respective Rx and Tx waveguide filters 40 and 60 to allow for the transmission and reception and filtering of RF Rx (receive) and Tx (transmit) signals as described in more detail below.

Also, in the embodiment shown, all of the separate blocks defining the module 10, with the exception of the antenna block 920, have the same width; all of the separate blocks defining the module 10 have the same height; the length of the upper blocks 200 and 300 is less than half the length of the respective base blocks 101 and 103; the length of the upper blocks 250 and 350 is less than half of the length of the upper blocks 200 and 300b; the length of the base block 103 is less than the length of the base block 101; and the length of the upper block 300 is less than the length of the upper block 200.

Each of the solid base or lower blocks or layers of dielectric material 101 and 103 is comprised of a suitable solid block or layer of dielectric material, such as for example ceramic; includes opposed longitudinal horizontal exterior top and bottom surfaces 102 and 104 extending longitudinally in the same direction as the respective longitudinal axis $L_1$ and $L_2$ of the respective blocks 101 and 103; opposed longitudinal side vertical exterior surfaces 106 and 108 extending longitudinally in the same direction as the respective longitudinal axis $L_1$ and $L_3$; and opposed transverse side vertical exterior end surfaces 110 and 112 extending in a direction generally normal to and intersecting the respective longitudinal axis $L_1$ and $L_3$.

Each of the blocks 101 and 103 includes a plurality of resonant sections (also referred to as cavities or cells or resonators) 114, 115, 116, and 118 and 120, 121, 122, and 123 respectively which extend in a spaced apart relationship along and in the same direction as the longitudinal axis $L_1$ and are separated from each other by a plurality of (and more specifically three in the embodiment shown) spaced-apart vertical slits or slots 124, 125, and 126 which are cut into the respective surfaces 108 of the respective blocks 101 and 103 and RF signal bridges 128, 129, and 130 and 132, 133, and 134 of dielectric material as described in more detail below.

The first plurality of slots 124, 125, and 126 extend along the length of the side surface 108 of the block 101 in a spaced-apart and parallel relationship relative to each other and in a relationship generally normal to the longitudinal axis $L_1$. Each of the slots 124, 125, and 126 cuts through the side surface 108 and the opposed horizontal surfaces 102 and 104 and partially through the body and the dielectric material of the block 101.

The second plurality of slots 124, 125, and 126 extend along the length of the side surface 108 of the block 103 in a spaced-apart and parallel relationship relative to each other; in a relationship generally normal to the longitudinal axis $L_3$. Each of the slots 124, 125 and 126 in the block 103 cuts through the side surface 108 and the opposed horizontal surfaces 102 and 104 and partially through the body and the dielectric material of the block 103. In the coupled relationship of the blocks of the module 10 as shown in the FIGURES, the first and second pluralities of slots 124, 125, and 126 on the respective blocks 101 and 103 are disposed in a co-linear and facing relationship.

Figure 2:
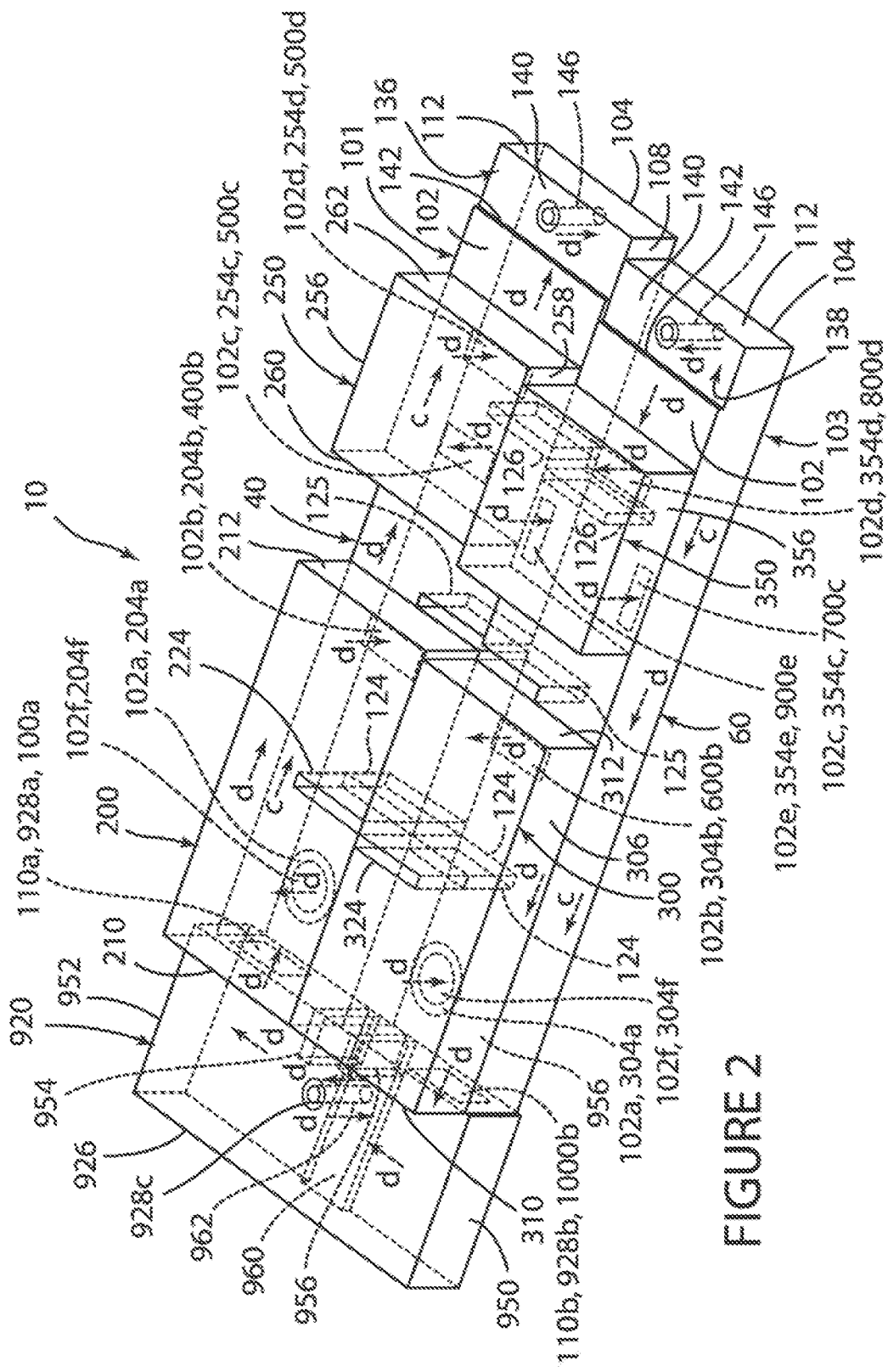
FIG. 2 is an enlarged perspective, part phantom view of the RF dielectric waveguide duplexer filter module shown in FIG. 1.
Figure 3:
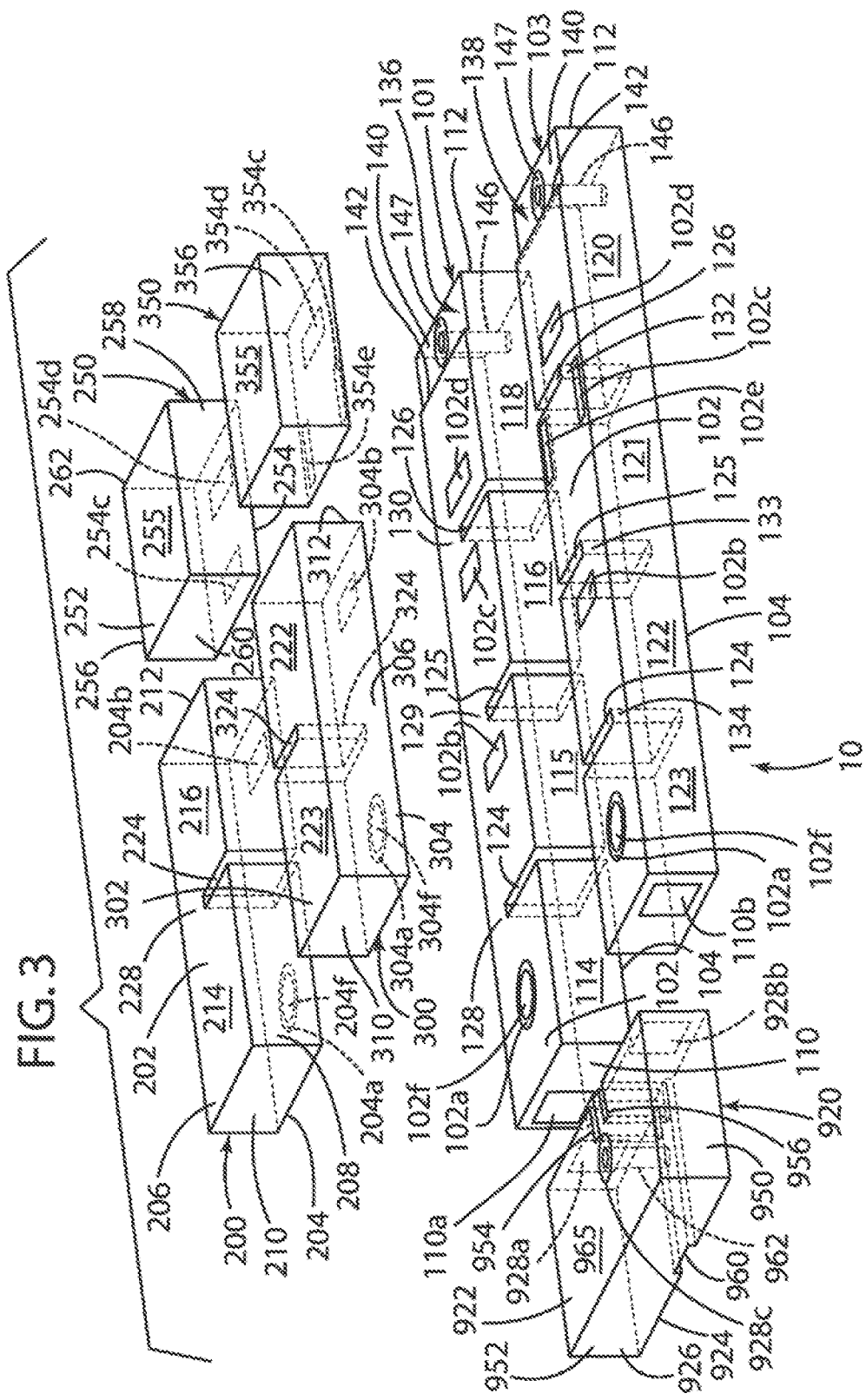
FIG. 3 is an enlarged exploded perspective, part phantom view of the RF dielectric waveguide duplexer filter module shown in FIG. 1.
Figure 4:
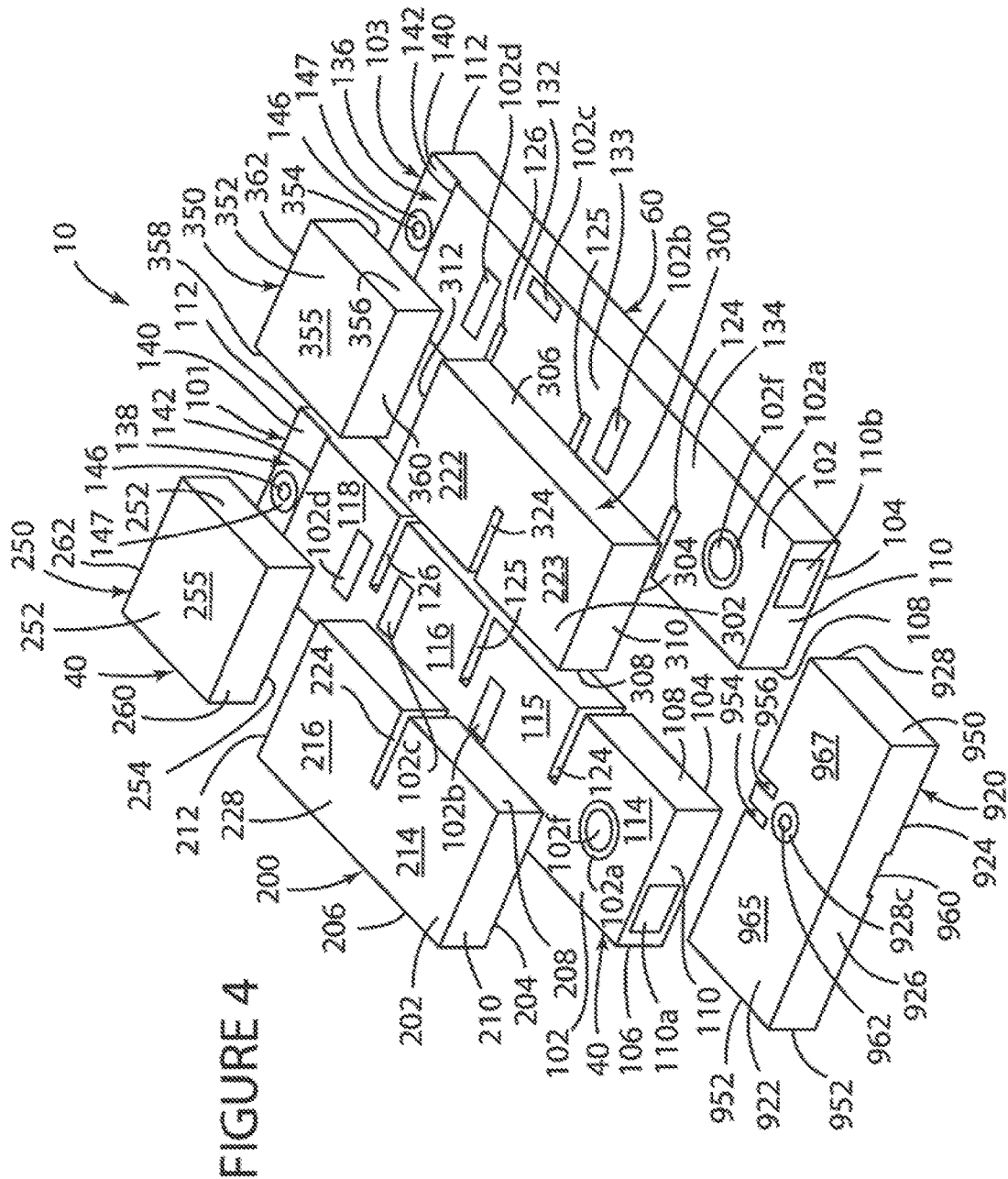
FIG. 4 is an enlarged exploded perspective view of the RF dielectric waveguide filter module shown in FIG. 1.
Figure 5:
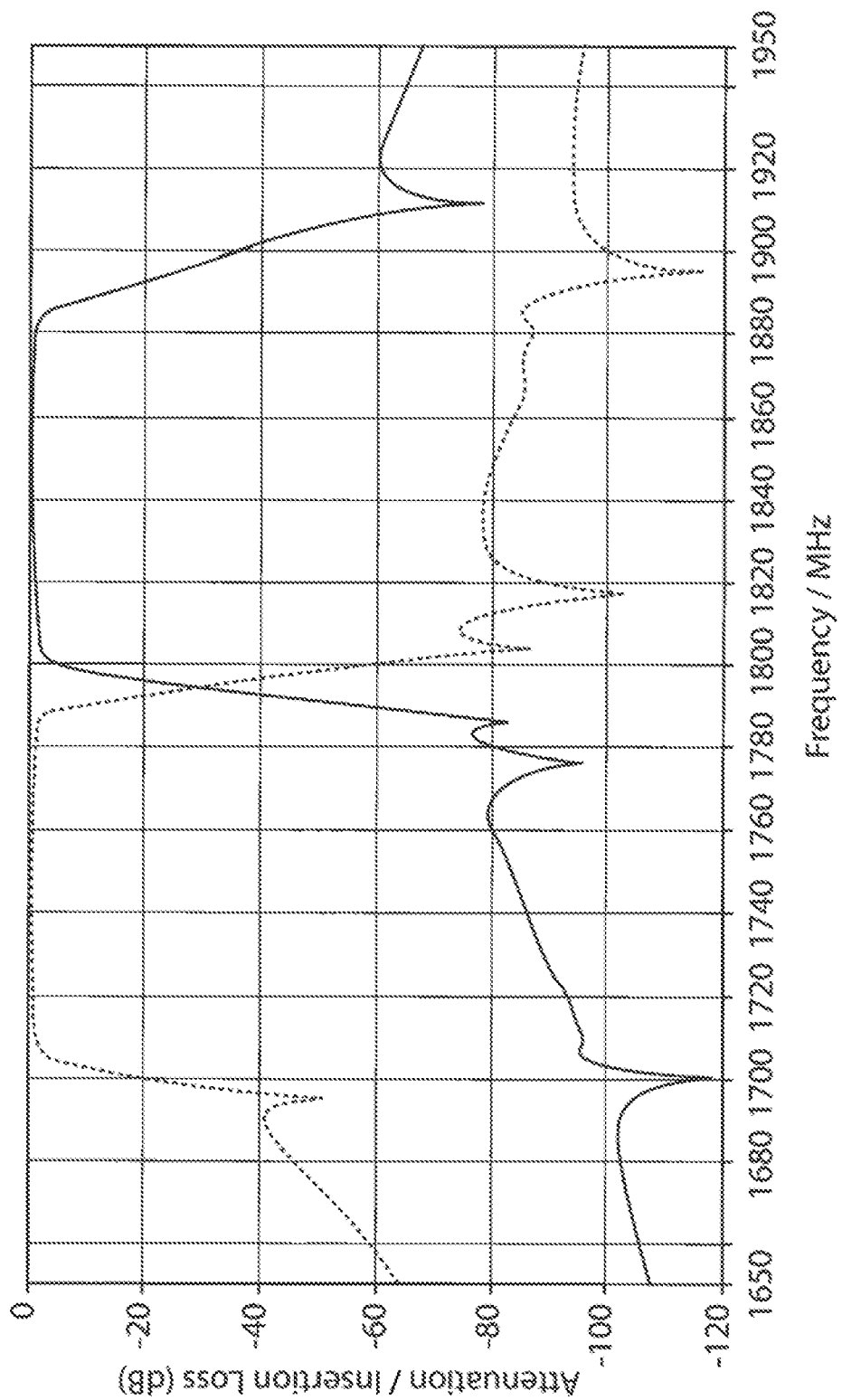
FIG. 5 is a graph depicting the performance of the RF dielectric waveguide duplexer filter module shown in FIG. 1.

Thus, in the embodiment of FIGS. 1, 2, and 3, the first and second pluralities of slots 124, 125, and 126 terminate short of the opposed side surface 106 so as to define respective RF signal bridges 128, 129, and 130 on the block 101 and RF signal bridges 132, 133, and 134 on the block 103 each comprised of a bridge or island of dielectric material which extends in the vertical direction between the surfaces 102 and 104 of each of the blocks 101 and 103 and in the horizontal direction between the respective slots 124 and 126 and the respective surfaces 106.

The bridge 128 of dielectric material on the block 101 bridges and interconnects the dielectric material of the resonator 114 to the dielectric material of the resonator 115, the bridge 129 of dielectric material bridges and interconnects the dielectric material of the resonator 115 to the dielectric material of the resonator 116, and the bridge 130 of dielectric material interconnects the dielectric material of the resonator 116 to the dielectric material of the resonator 118.

In a similar manner, the bridge 132 of dielectric material on the block 103 interconnects the dielectric material of the resonator 120 to the dielectric material of the resonator 121, the bridge 133 of dielectric material bridges and interconnects the dielectric material of the resonator 121 to the dielectric material of the resonator 122, and the bridge 134 of dielectric material bridges and interconnects the dielectric material of the resonator 122 to the dielectric material of the resonator 123.

In the embodiment shown, the width of each of the RF signal bridges or islands of dielectric material 128, 129, 130, 132, 133, and 134 is dependent upon the distance which the respective slots 124, 125, and 126 extend into the body of the respective blocks 101 and 103.

Although not shown in any of the FIGURES, it is understood that the thickness or width of the slots 124, 125, and 126 and the depth or distance which the slots 124, 125, and 126 extend from the side surface 108 into the body and dielectric material of each of the blocks 101 and 103 may be varied depending upon the particular application to allow the width and the length of the RF signal bridges 128, 129, 130, 131, 132, 133, and 134 to be varied accordingly to allow control of the electrical coupling and bandwidth of the respective Tx and Rx waveguide filters 40 and 60 hence control of the performance characteristics of the respective Tx and Rx waveguide filters 40 and 60.

The blocks 101 and 103 additionally comprise and define respective end steps or notches 136 and 138 each comprising, in the embodiment shown, a generally L-shaped recessed or grooved or shouldered or notched region or section of the longitudinal horizontal surface 102, opposed side surfaces 106 and 108, and side end surfaces 110 of the respective blocks 101 and 103 from which dielectric ceramic material has been removed or is absent.

Stated another way, the respective steps 136 and 138 are defined in and by a stepped or recessed end section or region of each of the respective blocks 101 and 103, and more specifically by a stepped or recessed end section or region of the portion of the respective blocks 101 and 103 defining the respective resonators 114 and 122, having a height less than the height of the remainder of the respective blocks 101 and 103.

Stated yet another way, the respective steps 136 and 138 each comprise a generally L-shaped recessed or notched portion of the respective end resonators 118 and 120 defined on the respective blocks 101 and 103 which includes a first generally horizontal surface 140 located or directed inwardly of, spaced from, and parallel to the horizontal surface 102 of the respective blocks 101 and 103 and a second generally vertical surface or wall 142 located or directed inwardly of, spaced from, and parallel to, the side end surface 110 of the respective blocks 101 and 103.

In the embodiment shown, the surface 140 and the wall 142 of the respective steps 136 and 138 are located between the side end surface 112 and spaced from the slot 126 of the respective blocks 101 and 103 with the surface 140 terminating and cutting into the side end surface 112 and the surface 140 and the wall 142 terminating at a point and location in the body of the respective blocks 101 and 103 that is spaced from and short of the slot 126 with the wall 142 being located between and spaced from and generally parallel to the slot 126 and the block end face 112.

The blocks 101 and 103 additionally each comprise an electrical RF signal input/output electrode in the form of respective through-holes 146 extending through the body of the respective blocks 101 and 103 in a relationship generally normal to the respective longitudinal axis $L_1$ and $L_3$ thereof and, more specifically, through the respective steps 136 and 138 thereof and, still more specifically, through the body of the respective end resonators 118 and 120 defined in the respective blocks 101 and 103 between, and in relationship generally normal to, the surface 140 of the respective steps 136 and 138 and the surface 102 of the respective blocks 101 and 103.

Still more specifically, the respective RF signal input/output through-holes 146 are spaced from and generally parallel to and located between the respective transverse side end surface 112 and the wall 142 of the respective blocks 101 and 103 and define respective generally circular openings terminating in the top step surface 140 and the bottom block surface 102 respectively of each of the respective blocks 101 and 103. Respective input/output pads of conductive material 147 surround the respective openings defined in the respective steps 136 and 138.

Thus, in the embodiment shown, in each of the respective blocks 101 and 103, the step wall 142 is located between and spaced from the slot 126 and the block end face 112 and the through-hole 146 is located between and spaced from the step wall 142 and the block end face 112.

All of the external surfaces 102, 104, 106, 108, 110, and 112 of the blocks 101 and 103, the internal surfaces of the slots 124, 125, and 126, and the internal surfaces of the input/output through-holes 146 are covered with a suitable conductive material such as for example silver except as otherwise described below.

Specifically, each of the blocks 101 and 103 and, more specifically, the top surface 102 of each of the blocks 101 and 103 defines a plurality of regions or portions devoid of conductive material and, still more specifically, in the embodiment shown, respective regions or portions 102a, 102b, 102c, and 102d as described in more detail below with the block 103 defining an additional region or portion 102e as also described in more detail below.

The respective regions or portions 102a are ring shaped regions or portions of dielectric material (i.e., regions or portions devoid of conductive material) which define respective isolated circular RF signal input/output transmission regions or pads or electrodes 102f respectively, are positioned in a relationship co-linear with the respective longitudinal axis $L_1$ and $L_2$, and are positioned in the region of the respective blocks 101 and 103 defining the respective resonators 114 and 123, and still more specifically are located in the region of the respective blocks between and spaced from the respective side surfaces 110 and the respective slots 124.

The respective regions or portions 102b are rectangular shaped regions or portions of dielectric material (i.e., regions or portions devoid of conductive material) which define respective RF signal transmission windows. In the embodiment shown, the regions or windows 102b intersect and are positioned in a relationship normal to the respective longitudinal axis $L_1$ and $L_2$ and further are positioned in the region of the respective resonators 115 and 122 of the respective blocks 101 and 103 and still further are positioned on the respective blocks 101 and 103 between and spaced from the respective slots 124 and 125.

The respective regions or portions 102c are also rectangular shaped regions or portions of dielectric material (i.e., regions or portions devoid of conductive material) which define respective RF signal transmission windows. In the embodiment shown, the region or window 102c on the block 101 intersects and is positioned in a relationship normal to the longitudinal axis $L_1$, and the region or window 102c on the block 103 is positioned in a relationship parallel and spaced from the longitudinal axis $L_2$ of the block 103. Moreover, the respective regions or windows 102c on the respective blocks 101 and 103 are positioned in the region of the respective resonators 116 and 121 of the respective blocks 101 and 103 and still more specifically in the region of the respective blocks 101 and 103 between the respective slots 125 and 126.

The respective regions or portions 102d are also rectangular shaped regions or portions of dielectric material (i.e., regions or portions devoid of conductive material) which define respective RF signal transmission windows. In the embodiment shown, the region or window 102d on the respective blocks 101 and 103 intersects and is positioned in a relationship normal to the respective longitudinal axis $L_1$ and $L_2$, are located in the region of the respective blocks 101 and 103 defining the respective resonators 118 and 120, and more specifically are located on the respective blocks 101 and 103 between and spaced from the respective slots 126 and the respective steps 136 and 138.

The block 103 includes one additional rectangular shaped region or portion 102e (FIGS. 2 and 3) of dielectric material (i.e., a region or portion devoid of conductive material) which defines an RF signal transmission window. In the embodiment shown, the region or window 102e on the block 103 is positioned in a relationship diametrically opposed to and parallel to the RF signal transmission window 102c and still more specifically in a relationship with the respective RF signal transmission windows 102c and 102e located on opposites sides of, and parallel to, and spaced from the longitudinal axis $L_2$.

Additionally, the blocks 101 and 103, and more specifically the exterior side surfaces 110 thereof, include respective generally rectangular shaped regions of dielectric material 110a and 110b (i.e., regions on the respective exterior surfaces 110 devoid of conductive material) defining respective RF signal transmission windows as described in more detail below.

The upper block 200 of the Rx waveguide filter 40 is generally rectangular in shape and is comprised of a suitable solid block of dielectric material, such as for example ceramic; includes opposed longitudinal horizontal exterior top and bottom surfaces 202 and 204 extending longitudinally in the same direction as the longitudinal axis $L_1$ of the block 200; opposed longitudinal side vertical exterior surfaces 206 and 208 extending longitudinally in the same direction as the longitudinal axis $L_1$; and opposed transverse side vertical exterior end surfaces 210 and 212 extending in a direction generally normal to and intersecting the longitudinal axis $L_1$.

The upper block 200 of the Rx waveguide filter 40 includes a plurality, i.e., a pair resonant sections (also referred to as cavities or cells or resonators) 214 and 216 that extend in a spaced apart relationship along and in the same direction as the longitudinal axis $L_1$ and are separated from each other by a slot 224 that is cut into the side surface 208 of the block 200 and the opposed horizontal surfaces 202 and 204 and partially through the body and the dielectric material of the block 200 to define an RF signal transmission bridge 228 of dielectric material.

All of the external surfaces 202, 204, 206, 208, 210, and 212 of the block 200 and the internal surfaces of the slot 224 are covered with a suitable conductive material such as for example silver except as otherwise described below.

Specifically, the block 200 defines a plurality, namely a pair, of regions or portions devoid of conductive material and, still more specifically, in the embodiment shown, respective regions or portions 204a and 204b.

The region or portion 204a is a ring shaped region or portion of dielectric material (i.e., a region or portion devoid of conductive material) which defines an isolated circular RF signal input/output transmission region or pad or electrode 204f that is positioned in a relationship co-linear with the longitudinal axis $L_1$ and is positioned in the region of the block 200 defining the resonator 214, and still more specifically is located in the region of the block 200 between and spaced from the side surface 210 and the slot 224.

The region or portion 204b is a rectangular shaped region or portion of dielectric material (i.e., a region or portion devoid of conductive material) which defines an RF signal transmission window. In the embodiment shown, the region or window 204b intersects and is positioned in a relationship normal to the longitudinal axis $L_1$ and further is positioned in the region of the resonator 216 of the block 200 and still further is positioned on the block 200 between and spaced from the slot 224 and the end face 212.

The block 200 is seated and stacked on top of the block 101 with the lower surface 204 of the block 200 abutted against the upper surface 102 of the block 101; the exterior side surface 210 of the block 200 in vertical co-planar alignment with the exterior side surface 110 of the block 101; the slot 224 in the block 200 in vertical co-planar alignment with the slot 124 in the block 101; the respective RF signal transmission pads 102a and 204a on the respective blocks 101 and 200 abutted against each other; and the respective RF signal transmission windows 102b and 204b on the respective blocks 101 and 200 in alignment with each other so as to define an internal RF signal transmission window 400b in the layer of conductive material defined between the blocks 101 and 200 by the respective layers of conductive material covering the respective exterior surfaces 102 and 204 of the respective blocks 101 and 200.

Thus, in the embodiment shown, the respective RF signal transmission pads 102a and 204a and the interior RF signal transmission window 400b are located on opposite sides of and spaced from the respective slots 124 and 224 in the respective blocks 101 and 200 and define respective direct coupling RF signal transmission paths or transmission lines for the transmission of the Rx signal between the respective blocks 101 and 200 as described in more detail below.

The upper block 250 of the Rx waveguide filter 40 is generally rectangular in shape and is comprised of a suitable solid block of dielectric material, such as for example ceramic; includes opposed longitudinal horizontal exterior top and bottom surfaces 252 and 254 extending longitudinally in the same direction as the longitudinal axis $L_1$ of the block 250; opposed longitudinal side vertical exterior surfaces 256 and 258 extending longitudinally in the same direction as the longitudinal axis $L_1$; and opposed transverse side vertical exterior end surfaces 260 and 262 extending in a direction generally normal to and intersecting the longitudinal axis $L_1$.

The upper block 250 of the Rx waveguide filter 40 includes one resonant section (also referred to as cavity or cell or resonator) 255.

All of the external surfaces 252, 254, 256, 258, 260, and 262 of the block 250 are covered with a suitable conductive material such as for example silver except as otherwise described below.

Specifically, the block 250 defines a plurality, namely a pair, of regions or portions devoid of conductive material and, still more specifically, in the embodiment shown, respective regions or portions 254c and 254d.

The region or portion 254c is a rectangular shaped region or portion of dielectric material (i.e., a region or portion devoid of conductive material) which defines an RF signal transmission window. In the embodiment shown, the region or window 254c on the block 250 intersects and is positioned in a relationship normal to the longitudinal axis $L_1$.

The region or portion 254d is also a rectangular shaped region or portion of dielectric material (i.e., a region or portion devoid of conductive material) which defines an RF signal transmission window. In the embodiment shown, the region or window 254d intersects and is positioned in a relationship normal to the respective longitudinal axis $L_1$ and is positioned in a relationship diametrically opposed, spaced from, and parallel to the RF signal transmission window 254c. The block 250 is seated and stacked on top of the block 101 with the lower surface 304 of the block 250 abutted against the upper surface 102 of the block 101; located between and spaced from the slot 125 and the step 136 on the block 101; the respective RF signal transmission windows 102c and 102d on the block 101 in alignment with the respective RF signal transmission windows 254c and 254d on the block 200 to define respective internal RF signal transmission windows 500c and 500d in the layer of conductive material defined between the blocks 101 and 250 by the respective layers of conductive material covering the respective exterior surfaces 102 and 254 of the respective blocks 101 and 250.

Thus, in the embodiment shown, the respective interior RF signal transmission windows 500c and 500d are located on opposite sides of and spaced from the slot 126 defined in the block 101 and define respective direct coupling RF signal transmission paths or transmission lines for the transmission of the Tx signal between the respective blocks 101 and 250 as described in more detail below.

The upper block 300 of the Tx waveguide filter 60 is generally rectangular in shape and is comprised of a suitable dielectric material, such as for example ceramic; includes opposed longitudinal horizontal exterior top and bottom surfaces 302 and 304 extending longitudinally in the same direction as the longitudinal axis $L_2$ of the block 300; opposed longitudinal side vertical exterior surfaces 306 and 308 extending longitudinally in the same direction as the longitudinal axis $L_2$; and opposed transverse side vertical exterior end surfaces 310 and 312 extending in a direction generally normal to and intersecting the longitudinal axis $L_2$.

The upper block 300 of the Tx waveguide filter 60 includes a plurality, i.e., a pair resonant sections (also referred to as cavities or cells or resonators) 222 and 223 that extend in a spaced apart relationship along and in the same direction as the longitudinal axis $L_2$ and are separated from each other by a slot 324 that is cut into the side surface 308 of the block 300 and the opposed horizontal surfaces 302 and 304 and partially through the body and the dielectric material of the block 300 to define an RF signal transmission bridge 328 of dielectric material.

All of the external surfaces 302, 304, 306, 308, 310, and 312 of the block 300 and the internal surfaces of the slot 324 are covered with a suitable conductive material such as for example silver except as otherwise described below.

Specifically, the block 300 defines a plurality, namely a pair, of regions or portions devoid of conductive material and, still more specifically, in the embodiment shown, respective regions or portions 304a and 304b.

The region or portion 304a is a ring shaped region or portion of dielectric material (i.e., a region or portion devoid of conductive material) which defines an isolated circular RF signal input/output transmission region or pad or electrode 304f that is positioned in a relationship co-linear with the longitudinal axis $L_2$ and is positioned in the region of the block 300 defining the resonator 223, and still more specifically is located in the region of the block 300 between and spaced from the block end face 310 and the slot 324.

The region or portion 304b is a rectangular shaped region or portion of dielectric material (i.e., a region or portion devoid of conductive material) which defines an RF signal transmission window. In the embodiment shown, the region or window 304b intersects and is positioned in a relationship normal to the longitudinal axis $L_2$ and further is positioned in the region of the resonator 222 of the block 300 and still further is positioned on the block 300 between and spaced from the slot 324 and the block end face 312.

The block 300 is seated and stacked on top of the block 103 with the lower surface 304 of the block 300 abutted against the upper surface 102 of the block 103; the exterior side surface 310 of the block 300 in vertical co-planar alignment with the exterior side surface 110 of the block 103; the slot 324 in the block 300 in vertical co-planar alignment with the slot 124 in the block 103; the respective RF signal transmission pads 102a and 304a on the respective blocks 101 and 300 abutted against each other; and the respective RF signal transmission windows 102b and 304b on the respective blocks 101 and 300 in alignment with each other to define an internal RF signal transmission window 600b in the layer of conductive material defined between the blocks 101 and 300 by the respective layers of conductive material covering the respective exterior surfaces 102 and 304 of the respective blocks 101 and 300.

Thus, in the embodiment shown, the respective RF signal transmission pads 102a and 304a and the interior RF signal transmission window 600b are located on opposite sides of and spaced from the respective slots 124 and 324 in the respective blocks 101 and 300 and define respective direct coupling RF signal transmission paths or transmission lines for the transmission of the Tx signal between the respective blocks 101 and 300 as described in more detail below.

The upper block 350 of the Tx waveguide filter 60 is generally rectangular in shape and is comprised of a suitable solid block of dielectric material, such as for example ceramic; includes opposed longitudinal horizontal exterior top and bottom surfaces 352 and 354 extending longitudinally in the same direction as the longitudinal axis $L_2$ of the block 350; opposed longitudinal side vertical exterior surfaces 356 and 358 extending longitudinally in the same direction as the longitudinal axis $L_2$; and opposed transverse side vertical exterior end surfaces 360 and 362 extending in a direction generally normal to and intersecting the longitudinal axis $L_2$.

The upper block 350 of the Tx waveguide filter 60 includes one resonant section (also referred to as cavity or cell or resonator) 355.

All of the external surfaces 352, 354, 356, 358, 360, and 362 of the block 250 are covered with a suitable conductive material such as for example silver except as otherwise described below.

Specifically, the block 350 defines a plurality, namely three, of regions or portions devoid of conductive material and, still more specifically, in the embodiment shown, respective regions or portions 354c, 354d, and 354e.

The region or portion 354c is a rectangular shaped region or portion of dielectric material (i.e., a region or portion devoid of conductive material) which defines an RF signal transmission window. In the embodiment shown, the region or window 354c on the block 350 is positioned in a relationship parallel and spaced from the longitudinal axis $L_2$.

The region or portion 354d is also a rectangular shaped region or portion of dielectric material (i.e., a region or portion devoid of conductive material) which defines an RF signal transmission window. In the embodiment shown, the region or window 354d intersects and is positioned in a relationship normal to the respective longitudinal axis $L_2$.

The region or portion 354e is also a rectangular shaped region or portion of dielectric material (i.e., a region or portion devoid of conductive material) which defines an RF signal transmission window. In the embodiment shown, the respective regions or windows 354c and 354e are positioned in a diametrically opposed relationship on opposite sides of and spaced from and parallel to the longitudinal axis $L_2$.

The block 350 is seated and stacked on top of the block 103 with the lower surface 304 of the block 350 abutted against the upper surface 102 of the block 103; located between and spaced from the slot 125 and the step 138 on the block 103; the respective RF signal transmission windows 102c, 102d, and 102e on the block 103 in alignment with the respective RF signal transmission windows 354c, 354d, and 354e on the block 350 to define respective internal RF signal transmission windows 700c, 800d, and 900e in the layer of conductive material defined between the blocks 101 and 350 by the respective layers of conductive material covering the respective exterior surfaces 102 and 354 of the respective blocks 101 and 350.

Thus, in the embodiment shown, the respective interior RF signal transmission windows 700c and 900e are located on one side of and spaced from the slot 126 defined in the block 126 while the other RF signal transmission window 800d is located on the other side of and spaced from the slot 126 and together define respective direct coupling RF signal transmission paths or transmission lines for the transmission of the Rx signal between the respective blocks 101 and 350 as described in more detail below.

Thus, in the embodiment shown, the base or lower blocks 101 and 103 are attached together in a side-by-side relationship with the respective exterior side surfaces 108 abutted against each other and defining an internal or interior ground layer of conductive material there between that is co-linear with the longitudinal axis $L_3$ of the waveguide filter module 10 and is defined by the respective layers of conductive material covering the respective exterior surfaces 108 of the respective blocks 101 and 103 and electrically separating the respective resonators on the block 101 from the respective resonators on the block 103; the respective slots 124, 125, and 126 in the respective blocks 101 and 103 face and are co-linear with each other; the respective exterior surfaces 208 and 308 of the respective upper blocks 200 and 300 abutted against each other and defining an internal or interior ground layer of conductive material there between by the respective layers of conductive material covering the respective exterior surfaces 208 and 308 of the respective upper blocks 200 and 300 and electrically separating the respective resonators in the block 200 from the respective resonators in the block 330; the respective slots 224 and 324 facing each other; and the respective exterior surfaces 258 and 358 of the respective upper blocks 250 and 350 abutted against each other and defining an internal or interior ground layer of conductive material there between by the respective layers of conductive material covering the respective exterior surfaces 258 and 358 of the respective blocks 250 and 350 and electrically separating the resonator in the block 300 from the resonator in the block 350.

In the embodiment shown, the upper blocks 200 and 250 are abutted against the respective upper blocks 300 and 350 in an off-setting relationship.

The Tx and Rx RF signal antenna block 920 is also comprised of a suitable solid block of dielectric material, such as for example ceramic; includes opposed longitudinal horizontal exterior top and bottom surfaces 922 and 924 extending longitudinally in the same direction as the respective longitudinal axis $L_4$ of the antenna block 920; opposed longitudinal side vertical exterior surfaces 926 and 928 extending longitudinally in the same direction as the longitudinal axis $L_4$; and opposed transverse side vertical exterior end surfaces 950 and 952 extending in a direction generally normal to and intersecting the longitudinal axis $L_4$.

A pair of slots 954 and 956 extend along the length of the longitudinal side surface 928 of the block 920 in a spaced-apart and parallel relationship relative to each other and in a relationship generally normal to the longitudinal axis $L_4$. Each of the slots 954 and 956 cuts through the side surface 928 and the opposed horizontal surfaces 922 and 924 and partially through the body and the dielectric material of the block 920.

The antenna block 920 additionally defines a step or notch 960 comprising, in the embodiment shown, a recessed or grooved or notched region or section of the lower horizontal exterior surface 924. In the embodiment shown, the step or notch 960 is generally centrally located in the block 920 and, extends the full width of the block 920 in a relationship normal and intersecting the longitudinal axis $L_4$ and terminates in respective grooves defined in the respective side exterior surfaces 926 and 928. The slots 954 and 956 are located in and extend in the same direction as the step or notch 960.

The antenna block 920 additionally comprises an electrical RF signal input/output electrode in the form of a through-hole 962 extending through the body of the block 920 in a relationship generally normal to the longitudinal axis $L_4$ thereof and, more specifically, through the step 960 and still more specifically defining respective openings in the step 960 and the top surface 922 of the block 920.

The antenna block 920 includes an Rx RF signal resonant section (also referred to as cavity or cell or resonator) 965 and a Tx RF signal resonant section 967 which respectively form part of and define respective additional resonators of the respective Rx and Tx filters 40 and 60. In the embodiment shown, the Rx and Tx resonators 965 and 967 are located on opposite sides of and spaced from the step 960 and the longitudinal axis $L_4$.

All of the external surfaces 922, 924, 926, 928, 950, and 952 of the block 920, the internal surfaces of the slots 954 and 956, and the internal surface of the RF signal input/ output through-hole 962 is covered with a suitable conductive material such as for example silver except as otherwise described below.

Specifically, the antenna block 920 and, more specifically, the exterior longitudinal exterior side surface 928 thereof, includes a pair of diametrically opposed rectangular shaped regions or portions 928a and 928b of dielectric material (i.e., regions or portions devoid of conductive material) that define respective RF signal transmission windows. A circular shaped region or portion 928C of dielectric material (i.e., a region or portion of the block devoid of conductive material) surrounds the opening defined in the top surface 912 of the antenna block 920 by the through-hole 962 defined therein.

The antenna block 920 is attached to the Rx and Tx waveguide filters 40 and 60 in a relationship with the longitudinal exterior side surface 928 of the antenna block 920 abutted against the respective exterior side surfaces 110 of the respective blocks 101 and 103 of the respective Rx and Tx waveguide filters 40 and 60 and still more specifically with the respective RF signal transmission windows 110a and 110b on the respective exterior surfaces 110 of the respective blocks 101 and 103 in alignment with the respective RF signal transmission windows 928a and 928b on the exterior surface 928 of the block 920 to define respective interior or internal RF signal transmission windows 1000a and 1000b in the interior or internal layer of conductive material between the block 920 and the blocks 101 and 103 that is defined by the exterior layer of conductive material on the respective exterior surfaces 110 and 928 of the respective blocks 101, 103, and 920. The windows 1000a and 1000b allow for the transmission of RF signals between the block 920 and the blocks 101 and 103 as described in more detail below.

Specifically, the Tx RF signal is adapted to be inputted into the Tx RF waveguide filter 60 and through-hole 146 at one end of the Tx RF signal waveguide filter 60, then is transmitted through the Tx signal blocks 103, 350, and 300 of the Tx RF signal waveguide filter 60 as described in more detail below, then is transmitted into the antenna block 920 via and through the interior or internal Tx RF signal transmission window 1000b located between the Tx block 103 and the antenna block 920, and then is outputted via the antenna through-hole 962.

An Rx RF signal is adapted to be inputted into the antenna block 920 via and through the antenna through-hole 962 and transmitted through the antenna block 920, then is inputted into the Rx RF signal waveguide filter module 40 via and through the interior or internal RF signal transmission window 1000a located between the antenna block 920 and the Rx block 101, then is transmitted through Rx signal blocks 101, 200, and 250, and then is outputted via and through the through-hole 146 in the block 101.

In accordance with the present invention, the respective Rx and Tx signal waveguide filters 40 and 60 include both direct RF signal transmission paths or couplings, generally designated with the arrows d in FIGS. 1 and 2 and also indirect or cross or inductive RF signal transmission paths or couplings, generally designated with the arrows c in FIGS. 1 and 2. Further, in accordance with the present invention, all of the indirect/inductive/cross-couplings are located in the respective base or lower blocks or layers of dielectric material 101 and 103 of the respective Rx and Tx waveguide filters 40 and 60.

In accordance with the present invention, the placement of all of the indirect cross-couplings in the lower layers or blocks 101 and 103 of the Rx and Tx filters allows for the RF signal antenna, Rx, and Tx input/outputs to all be located on the lower Rx, Tx, and antenna blocks 101, 103, and 920 respectively which allows for either a surface mount of the filter 10 directly to the surface of a printed circuit board (not shown) or the use of connectors (not shown) extending from the exterior top surface of the respective lower layer blocks 101, 103, and 920 of the filter module 10.

Further, in accordance with the present invention, the placement of all of the indirect cross-couplings in the lower layers or blocks 101 and 103 of the Rx and Tx filters allows for the antenna Tx and Rx signal input/output through-hole 962 and the respective Rx and Tx signal input/output through-holes 146 to be located at opposite ends of the duplexer module 10 and still more specifically to be positioned and located in the same lower or base plane or blocks 101, 103, and 920 of the filter module 10 again so as to allow for surface mounting of the filter 10 to a printed circuit board or substrate or the like or the use of connectors (not shown) extending from the exterior top surface of the respective lower layer blocks 101, 103, and 920 of the filter module 10.

Still further in accordance with the present invention, the stacking of the blocks 200 and 250 on top of the base block 101 of the Rx filter 40 and the stacking of the blocks 300 and 350 on the top of the base block 103 of the Tx filter 60 allows for a reduction in the overall length and footprint of the filter module 10 and further allows for additional cross-couplings in the respective base blocks 101 and 103 that improve the overall performance of the filter module 10.

Thus, and as shown in FIGS. 1 and 2, the Tx signal at all times is transmitted and flows both via direct and cross-coupling RF signal transmission paths through the blocks 103, 350, and 300 of the Tx waveguide filter 40 in one direction towards the antenna block 920 and parallel with the duplexer filter longitudinal axis $L_3$ with the exception of the direct coupling RF signal transmission paths between the lower block 103 and the upper blocks 300 and 350 which are disposed in a relationship generally normal or perpendicular to the longitudinal axis $L_3$.

Still more specifically, and referring to FIGS. 1 and 2, the RF signal bridges 132 and 134 on the lower block 103 define cross-coupling RF signal transmission paths C in the direction of the antenna block 920; the RF signal bridge 133 on the lower block 103 defines a direct coupling RF signal transmission path d in the direction of the antenna block 920; the RF signal bridge 328 on the upper block 300 defines a direct coupling RF signal transmission path d in the direction of the antenna block 920; and the respective internal RF signal transmission pads and windows 102, 304a, 600b, 700c, 800d, and 900e all define direct coupling RF signal transmission paths between the respective blocks 103, 300, and 350 in a direction normal to the duplexer longitudinal axis $L_3$.

Still more specifically, the direct transmission path for the Tx RF signal includes transmission through the following resonators successively as shown in FIGS. 1 and 2: 120, 355, 121, 122, 222, 223, 123, and 967 and the indirect or cross-coupling transmission path for the Tx RF signal includes transmission from the resonator 120 into the resonator 121 and transmission from the resonator 122 into the resonator 123.

In a similar manner as shown in FIGS. 1 and 2, the Rx signal at all times is transmitted and flows both via direct and cross-coupling RF signal transmission paths through the blocks 101, 200, and 250 of the Rx waveguide filter 60 in one direction towards the Rx input/output through-hole 146 of the Rx block 101 and parallel with the duplexer filter longitudinal axis $L_3$ with the exception of the direct coupling RF signal transmission paths between the lower block 101 and the upper blocks 200 and 250 which are disposed in a relationship normal or perpendicular to the longitudinal axis $L_3$.

Still more specifically, and referring to FIGS. 1 and 2, the RF signal bridges 128 and 130 on the lower block 101 define cross-coupling RF signal transmission paths C in the direction of the Rx input/output through-hole 146; the RF signal bridge 125 on the lower block 101 defines a direct coupling RF signal transmission path d in the direction of the Rx input/output through-hole 146; the RF signal bridge 228 on the upper block 200 defines a direct coupling RF signal transmission path d in the direction of the Rx input/output through-hole 146; and the respective RF signal transmission pads and windows 102a, 204a, 400b, 500c, and 500d all define direct coupling RF signal transmission paths between the respective blocks 101, 200, and 250 in a direction normal to the duplexer longitudinal axis $L_3$.

Still more specifically, the direct transmission path for the Rx RF signal includes transmission through the following resonators successively as shown in FIGS. 1 and 2: 965, 114, 214, 216, 115, 116, 255, and 118 while the indirect or cross-coupling transmission path for the Rx RF signal includes transmission from the resonator 114 into the resonator 115 and transmission from the resonator 116 into the resonator 118.

While the invention has been taught with specific reference to the RF dielectric waveguide duplexer filter module embodiment shown, it is understood that a person of ordinary skill in the art will recognize that changes can be made in form and detail without departing from the spirit and the scope of the invention. The described embodiment is to be considered in all respects only as illustrative and not restrictive.

For example, it is understood that the resonant RF frequencies and couplings between the resonators of the respective Tx, Rx, and antenna blocks of dielectric material can be controlled as desired depending on the particular desired application by adjusting or varying for example the number, length, width, height, depth, size, location, configuration, orientation, and structure of the various blocks, slots, through-holes, steps, RF signal transmission pads, and RF signal transmission windows defined in the respective Tx, Rx, and antenna blocks of dielectric material of the filter module.

What is claimed is:

1. An RF dielectric waveguide duplexer filter module for the transmission of Tx and Rx RF signals comprising:
   respective separate first, second, and third solid blocks of dielectric material including a first antenna and second and third Tx and Rx solid blocks of dielectric material stacked on the first antenna block;
   a layer of conductive material covering exterior surfaces of each of the respective separate first antenna and second and third Tx and Rx blocks;
   respective antenna and Tx and Rx input/outputs on the first antenna and second and third Tx and Rx blocks, the Tx and Rx blocks being positioned relative to each other in a relationship with the Tx and Rx input/outputs positioned in a spaced side-by-side relationship relative to each other; and
   respective RF signal transmission windows in the layer of conductive material defining direct coupling RF signal transmission paths between the first antenna and the second and third Tx and Rx blocks.

2. An RF dielectric waveguide duplexer filter module for the transmission of Tx and Rx RF signals comprising:
   an antenna block of dielectric material including an antenna input/output, the antenna block including a plurality of exterior surfaces covered with a layer of conductive material and first and second antenna Tx and Rx signal transmission regions on one of the exterior surfaces defining a direct coupling path for the transmission of the Tx and Rx RF signals;
   a Tx RF signal waveguide filter including:
      stacked Tx blocks of dielectric material including exterior surfaces covered with a layer of conductive material and defining a plurality of resonators;
      a plurality of Tx RF signal transmission regions defined between the stacked Tx blocks defining a direct coupling path for the transmission of the Tx RF signal between the stacked Tx blocks;
      a third antenna Tx RF signal transmission region defined on one end exterior surface of one of the Tx blocks defining a direct coupling path for the transmission of the Tx RF signal from the one of the Tx blocks into the antenna block; and
      a Tx RF signal input/output defined on one of the Tx blocks;
   an RF Rx signal waveguide filter including:
      stacked Rx blocks of dielectric material including exterior surfaces covered with a layer of conductive material and defining a plurality of resonators;
      a plurality of Rx RF signal transmission regions defined between the Rx blocks defining a direct coupling path for the transmission of the Rx RF signal between the stacked Rx blocks;
      a fourth antenna Rx RF signal transmission region defined on one end exterior surface of one of the Rx blocks defining a direct coupling path for the transmission of the Rx RF signal from the antenna block into the one of the Rx blocks;
      an Rx RF signal input/output defined on one of the Rx blocks; and
   the Tx and Rx RF signal waveguide filters being attached in side-by-side relationship and the antenna block being attached to the Tx and Rx blocks of the respective Tx and Rx signal waveguide filters in a side-by-side relationship along the end of the Tx and Rx signal blocks with the respective antenna Tx and Rx signal transmission regions.

3. The RF dielectric waveguide duplexer filter module of claim 2, wherein the first, second, third, and fourth antenna Tx and Rx signal transmission regions are defined by respective first, second, third and fourth RF signal transmission windows of dielectric material in the layer of conductive material covering the respective blocks of dielectric material.

4. The RF dielectric waveguide duplexer filter module of claim 3, wherein the plurality of Tx and Rx RF signal transmission regions between upper and lower Tx and Rx RF signal blocks are defined by respective RF signal transmission windows of dielectric material in the layer of conductive material covering the respective blocks of dielectric material or respective isolated RF signal transmission pads of conductive material.

5. The RF dielectric waveguide duplexer filter module of claim 4, further comprising one or more bridges of dielectric material on lower Tx and Rx blocks defined by one or more slots in the lower Tx and Rx blocks.

6. The RF dielectric waveguide duplexer filter module of claim 5, wherein the Tx and Rx waveguide filters each include respective lower Tx and Rx blocks and respective first and second upper Tx and Rx blocks stacked on the respective lower Tx and Rx blocks.

7. The RF dielectric waveguide duplexer filter module of claim 6, wherein an RF signal transmission window and an RF signal transmission pad are defined between respective Tx and Rx lower blocks and respective first upper Tx and Rx blocks and at least first and second RF signal transmission windows are defined between the respective Tx and Rx lower blocks and respective second upper Tx and Rx blocks.

8. The RF dielectric waveguide duplexer filter module of claim 7, wherein Tx and Rx waveguide filters define respective Tx and Rx longitudinal axes, the RF signal transmission window and the RF signal transmission pad defined between the respective Tx and Rx lower blocks and the respective first upper Tx and Rx blocks intersecting the respective Tx and Rx longitudinal axes and at least one of the first and second RF signal transmission windows defined between the respective Tx and Rx lower blocks and the respective second upper Tx and Rx blocks intersecting the respective Tx and Rx longitudinal axes.

9. The RF dielectric waveguide duplexer filter module of claim 8, wherein the first and second RF signal transmission windows defined between the respective Rx lower block and the second upper Rx block intersect the Rx longitudinal axis, and further comprising a third RF signal transmission window defined between the Tx lower block and the second upper Tx block, the other of the first and second RF signal transmission windows and the third RF signal transmission window defined between the Tx lower block and the second upper Tx block being located on opposite sides of and parallel to the Tx longitudinal axis.

10. The RF dielectric waveguide duplexer filter module of claim 9, wherein the lower block of each of the Tx and Rx waveguide filters defines a step and respective input/output through-holes terminating in respective openings in the respective step, the respective RF Tx and Rx input/outputs surrounding the respective openings in the respective steps.

11. An RF dielectric waveguide duplexer filter module for the transmission of Tx and Rx RF signals comprising:
- a first plurality of separate blocks of dielectric material each including a plurality of exterior surfaces and coupled together to define a Tx RF signal filter including a base Tx RF signal block defining a Tx RF signal input/output and one or more upper Tx RF signal blocks stacked on the base Tx RF signal block;
- a second plurality of separate blocks of dielectric material each including a plurality of exterior surfaces and coupled together to define a Rx RF signal filter including a base Rx signal block defining a Rx RF signal input/output and one or more upper Rx RF signal blocks stacked on the base Rx RF signal block;
- a separate antenna block of dielectric material including a plurality of exterior surfaces and defining a Tx and Rx signal input/output and coupled to the base Tx and Rx signal blocks;
- a layer of conductive material covering the plurality of exterior surfaces of each of the respective first and second plurality and antenna blocks of dielectric material;
- first and second direct coupling RF signal transmission paths defined between the antenna block and the respective base Tx and Rx blocks;
- a plurality of third direct coupling RF signal transmission paths defined between the respective base Tx and Rx blocks and the respective upper Tx and Rx blocks; and
- one or more cross-coupling RF signal transmission paths defined in each of the base Tx and Rx RF signal blocks.

12. The RF dielectric waveguide duplexer filter module of claim 11, wherein the first, second, and third direct coupling RF signal transmission paths are defined by respective direct coupling RF signal transmission windows defined in the layer of conductive material.

13. The RF dielectric waveguide duplexer filter module of claim 12, wherein the respective direct coupling RF signal transmission windows are defined by respective regions on selected ones of the plurality of exterior surfaces of the respective blocks which are devoid of the layer of conductive material.

14. The RF dielectric waveguide duplexer filter module of claim 11, wherein the one or more cross-coupling RF signal transmission paths are defined by one or more bridges of dielectric material defined in each of the base Tx and Rx RF signal blocks respectively.

15. The RF dielectric waveguide duplexer filter module of claim 11, wherein all of the cross-coupling RF signal transmission paths are defined in the base Tx and Rx signal blocks, the respective Tx and Rx RF signal input/outputs are located at one end of the filter module, and the antenna RF signal input/output is located at an opposite end of the filter module.

* * * * *